(12) United States Patent
Edmonds et al.

(10) Patent No.: US 9,469,362 B1
(45) Date of Patent: Oct. 18, 2016

(54) BICYCLE FRAME

(71) Applicant: The Recycle Cycles LLC, Redondo Beach, CA (US)

(72) Inventors: Bryce W. Edmonds, Los Angeles, CA (US); Jason W. Cave, Redondo Beach, CA (US)

(73) Assignee: Recycle Cycles LLC, Redondo Beach, CA (US)

(*) Notice: Subject to any disclaimer, the term of this patent is extended or adjusted under 35 U.S.C. 154(b) by 0 days.

(21) Appl. No.: 14/209,176

(22) Filed: Mar. 13, 2014

Related U.S. Application Data

(60) Continuation-in-part of application No. 29/470,199, filed on Oct. 18, 2013, now Pat. No. Des. 759,549, which is a division of application No. 29/449,143, filed on Mar. 14, 2013, now Pat. No. Des. 697,836.

(60) Provisional application No. 61/787,482, filed on Mar. 15, 2013.

(51) Int. Cl.
*B62K 3/02* (2006.01)
*B62K 19/10* (2006.01)

(52) U.S. Cl.
CPC ..................... *B62K 3/02* (2013.01)

(58) Field of Classification Search
CPC ...... B62K 19/00; B62K 19/02; B62K 19/04; B62K 19/06; B62K 19/08; B62K 19/10; B62K 3/04; B62K 3/068; B62K 3/06; B62K 3/02
USPC .................... 280/281.1, 274, 304.3
See application file for complete search history.

(56) References Cited

U.S. PATENT DOCUMENTS

| | | | | |
|---|---|---|---|---|
| 474,327 | A * | 5/1892 | Meigs et al. | 280/261 |
| 475,445 | A * | 5/1892 | Edwards | 280/264 |
| 566,861 | A * | 9/1896 | Houghton | 280/261 |
| D26,898 | S | 4/1897 | Carroll | |
| 609,171 | A * | 8/1898 | Stevens | 280/281.1 |
| 1,343,616 | A * | 6/1920 | Crear | 280/258 |
| D104,141 | S | 4/1937 | Henry | |
| 2,333,642 | A * | 11/1943 | Dempsey et al. | 280/281.1 |
| 2,550,941 | A * | 5/1951 | Schuricht | 280/288 |
| 5,259,636 | A * | 11/1993 | Morales | 280/281.1 |
| 5,397,146 | A | 3/1995 | Fischer | |
| D548,141 | S * | 8/2007 | Pizzi | D12/111 |
| 7,591,475 | B1 | 9/2009 | Calfee | |
| 8,439,382 | B2 * | 5/2013 | Tortola | 280/281.1 |
| 2007/0241532 | A1 * | 10/2007 | Ellsworth | 280/281.1 |
| 2009/0026728 | A1 | 1/2009 | Domahidy | |
| 2009/0243252 | A1 * | 10/2009 | Sherman | 280/281.1 |
| 2012/0019019 | A1 * | 1/2012 | Meredith | 296/21 |
| 2012/0274041 | A1 * | 11/2012 | Nicol | 280/281.1 |
| 2014/0054873 | A1 * | 2/2014 | Cocalis | 280/281.1 |

FOREIGN PATENT DOCUMENTS

| | | | |
|---|---|---|---|
| DE | 587759 | * | 11/1933 |
| DE | 4435518 | * | 4/1996 |
| FR | 383577 | * | 3/1908 |
| FR | 560242 | * | 10/1923 |
| FR | 877549 | * | 12/1942 |
| FR | 2480221 | * | 10/1981 |

* cited by examiner

Primary Examiner — Anne Marie Boehler
(74) Attorney, Agent, or Firm — Blank Rome LLP

(57) ABSTRACT

A bicycle frame that has a head tube that is adapted to support a handle bar, a top tube that is coupled to the head tube, a bottom tube that is coupled to the head tube, and a seat tube segment that is adapted to support a seat. The seat tube segment extends from the top tube and is spaced from the bottom tube.

11 Claims, 7 Drawing Sheets

BICYCLE FRAME

RELATED APPLICATIONS

This application claims priority to U.S. provisional application Ser. No. 61/787,482, entitled Bicycle Frame Without Seat Tube, and filed on Mar. 15, 2013. This application is also a continuation-in-part to U.S. Design application Ser. No. 29/470,199, which is a divisional of Design Pat. No. D697,836 entitled Bicycle Frame, filed Mar. 14, 2013. The contents of all of these applications is hereby incorporated by reference in their entireties.

FIELD OF THE INVENTION

The present invention relates to a bicycle frame that provides support for a rider and counteracts horizontal and vertical forces using an seat tube segment.

BACKGROUND OF THE INVENTION

Conventional metal bicycle frames, such as shown in FIG. 1, have long been known and widely used. Since the late 1800s, regardless of the type of metal used, bicycles have generally followed the same format: head tube 1, top tube 2, down or bottom tube 3, seat tube 4, seat stays 5, bottom bracket 6, chain stays 7, and bracket 8 connected in two triangles, forming the two-triangle, "diamond frame" most recognizable as a bicycle. Variations on this model have always included a seat tube or something similar extending between the top and bottom tubes to support the rider's weight. "Step-through" frames modify the diamond design, but still rely on a seat tube. Even suspension-type bicycles include some variation of the recognizable extended seat tube.

A bicycle frame allows for almost no vertical deflection. A large portion of this stiffness is carried through the seat tube, which experiences infinitesimal flex in a vertical plane. Under force, a bare frame will remain nearly rigid. The total frame deflection on a complete bicycle under vertical force will only be a small percentage of the flex available in the bike "system," including tires, wheels, handlebars and saddle. The seat tube, then, is an expedient method of engineering a vertical-force-resistant frame.

The diamond frame, with its seat tube-dependent design, also serves to absorb vibrations and impact from the road and transfer them away from the rider. The impact force is redirected around the triangles and focuses the forces on the main tube welds more as compression than flex.

The traditional bicycle-frame seat tube also helps to reduce horizontal deflection, including lateral flex. Frames that experience lateral flex may have resultant difficulties in the bicycle's drive train (cog, chain ring, chain, derailleurs), brakes and overall stability.

Diamond-frame construction and its variants limit frame construction to the standard two-triangle format, which includes a seat tube. This reliance on building traditional-geometry bicycles defeats frame innovation, as well as any attempts to minimize material use.

SUMMARY OF THE INVENTION

Accordingly, the present invention provides a bicycle frame that may have a head tube that is adapted to support a handle bar, a top tube that is coupled to the head tube, a bottom tube that is coupled to the head tube, and a seat tube segment that is adapted to support a seat. The seat tube segment extends from the top tube and is space from, that is not connected to, the bottom tube.

The present invention may also provide a bicycle frame that may have a head tube that is adapted to support a handle bar, a top tube that is coupled to the head tube, a bottom tube that is coupled to the head tube, and a plurality of support members where at least one support member extends between the top tube and the bottom tube. The bicycle frame may also have a seat tube segment that is adapted to support a seat. The seat tube segment extends from the top tube and is spaced from the bottom tube.

The present invention may further provide a bicycle frame that may have a head tube that is adapted to support a handle bar, a top tube that is coupled to the head tube; a bottom tube that is coupled to the head tube, a chain stay that is coupled to the bottom tube, and a seat tube segment that is adapted to support a seat. The seat tube segment extends from the top tube and is spaced from the bottom tube. A main gusset extends between the top tube, the bottom tube and either the chain stay or the seat tube segment. A secondary gusset extends between the seat tube segment and the top tube.

With those and other objects, advantages, and features of the invention that may become hereinafter apparent, the nature of the invention may be more clearly understood by reference to the following detailed description of the invention, the appended claims, and the several drawings attached herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

Figure 1:
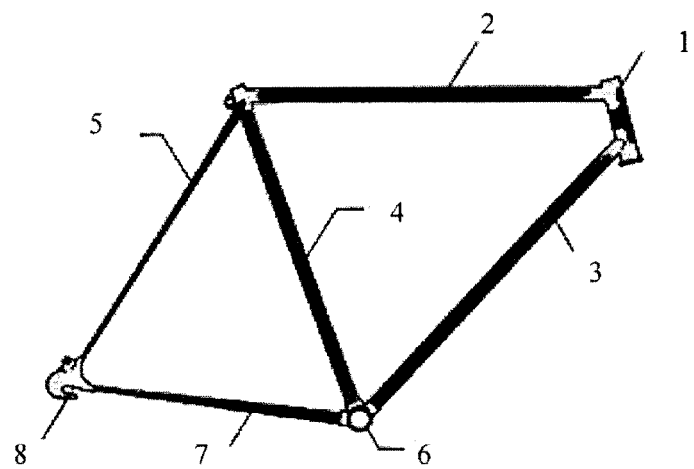
FIG. 1 is an elevational view of a prior art bicycle frame.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Referring to FIGS. 2A, 2B, 3, 4A, 4B, 5A and 5B, the present invention generally provides an improved bicycle frame design that uses a seat tube segment that unlike conventional seat tubes, does not extend between the top and bottom tubes of the frame. The exemplary embodiments of the present invention make it possible to expand on current metal-frame bicycle designs, while reducing material use. The geometries of the exemplary embodiments of the present invention also allow for greater aerodynamics and new ways to accommodate belt- and shaft-driven bicycles by allowing for new chain stay positioning and increased space between the drive train and the rear wheel.

Figure 3:
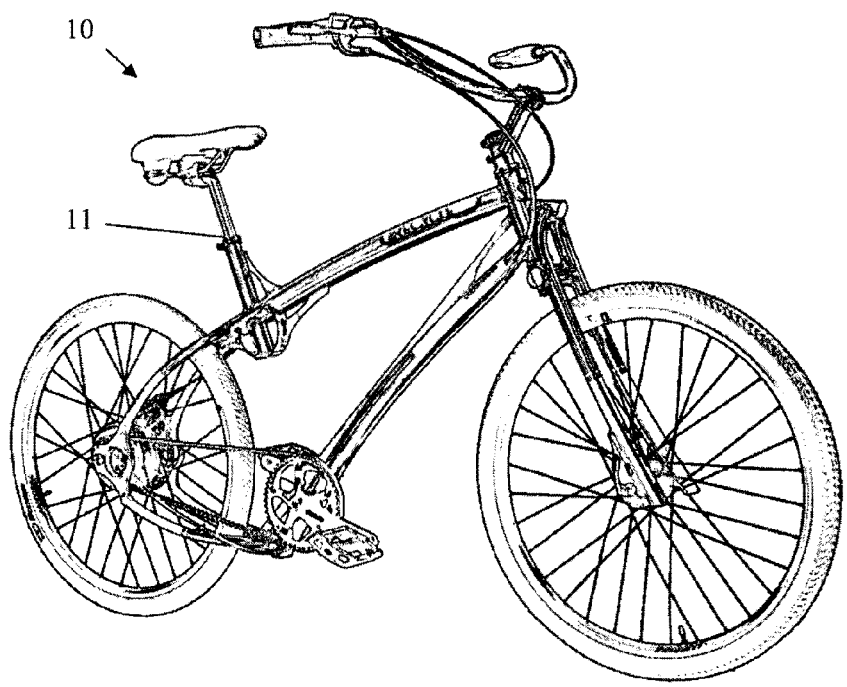
FIG. 3 is a perspective view of a bicycle that includes the bicycle frame illustrated in FIGS. 2A and 2B.
Figure 2A:
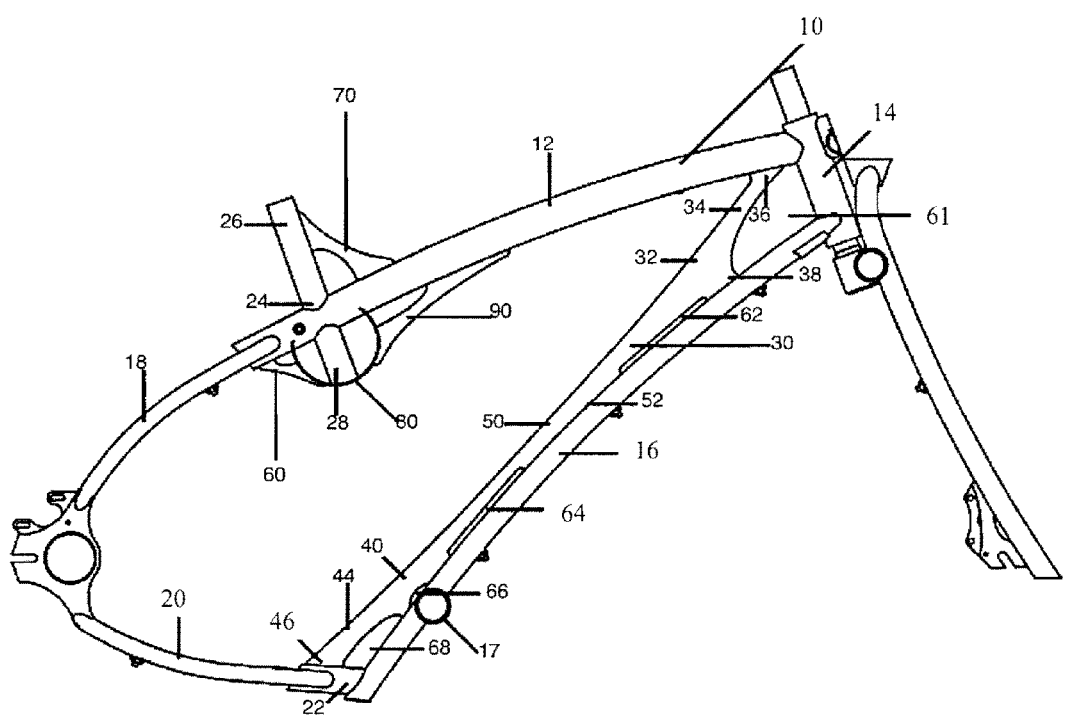
FIGS. 2A and 2B are elevational and perspective views, respectively, of a bicycle frame according to a first exemplary embodiment of the present invention.
Figure 2B:
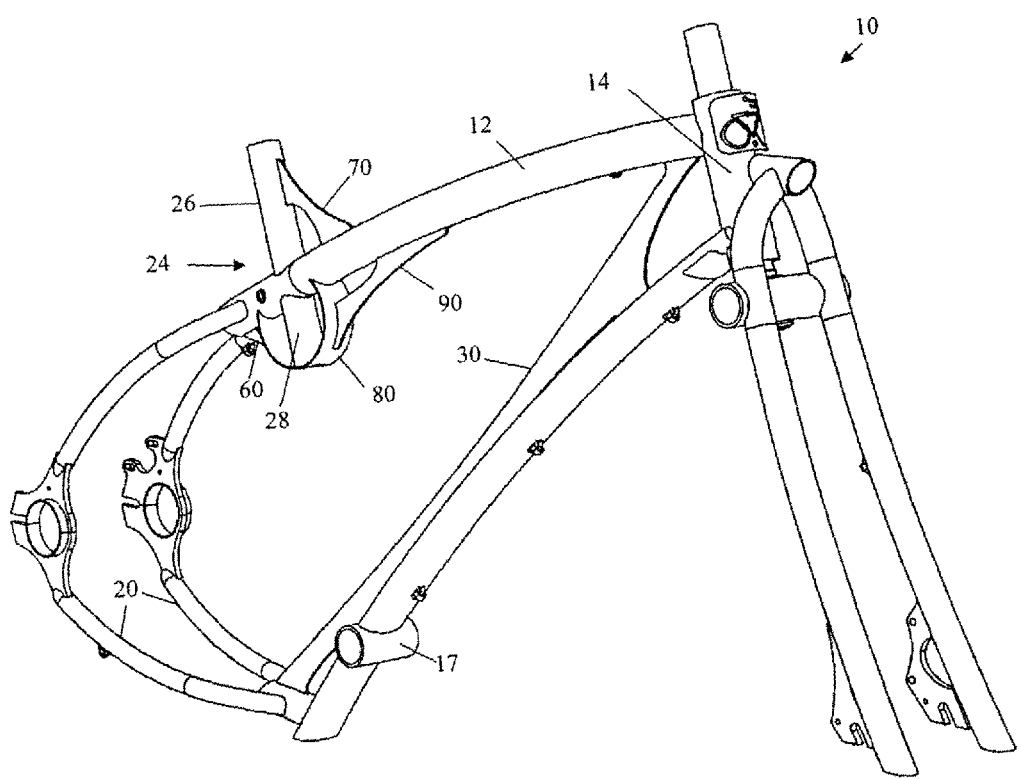

FIGS. 2A, 2B, and 3 illustrate a bicycle frame 10 according to a first exemplary embodiment of the present invention. The frame 10 may include a top tube 12, a head tube 14, a down or bottom tube 16, a bottom bracket 17, seat stays 18, chain stays 20 and a chain stays yoke 22. The head tube 14 is adapted to support a handle bar. The frame 10 is devoid of a conventional seat tube and instead includes a plurality of support members, such as gussets 30, 60, 70, and 90 that provide support braces for the frame. The gussets may attach to the top tube 12, down tube 16, and head tube 14, as well as the chain stays yoke 22 and the seat stays 18 as needed. The frame 10 of the present invention does not include a seat tube that extends from the top tube 12 to the bottom tube 16. Rather, an abbreviated or short seat tube segment 24, that is spaced from and not connected to the bottom tube 16 is provided to afford attachment for support structures and accept and secure the seat post 11 (FIG. 3). The seat tube segment 24 preferably forms an upper seat tube portion 26 that extends above the top tube 12, and a lower seat tube portion 28 that extends below the top tube 12. The down tube 16 preferably extends past the bottom bracket 17 and attaches to the chain stays yoke 22. That extended geometry serves several purposes. It allows for extra support from the main gusset 30 and allows for dropped chain stays 20 that increase strength and allow for easier belt drive insertion. Chain stays normally attach directly from the rear dropout of the frame horizontally to the bottom bracket section of the frame. That requires a frame builder to add a "break" in the frame whereby the belt (which is one solid piece) is to be inserted into place. In the present invention, a chain is "breakable," thus can be taken apart and rapped around the common horizontal chain stay.

The bicycle frame 10 forms its distinctive structure due to the shapes of the top tube 12, head tube 14, down tube 16, seat stays 18, chain stays 20 and chain stays yoke 22, as well as the structural connections between those components. The down tube 16 may have a slight upwards bend, which resists vertical forces from the rider, shocks and braking. The top tube 12 may be shaped to resist vertical forces from the rider, shocks and braking, while also curving in such a manner as to increase strength in conjunction with the seat and chain stays 18 and 20. Seat stays 18 and chain stays 20 have a curved structure that also increases resistance to both vertical and horizontal forces. The chain stays 20 shape also allows for belt drive insertion onto the cog and the chain ring attached to the back wheel without the need to create a break in the frame, thereby also increasing structural integrity. The top tube 12, head tube 14, and down tube 16 geometry forms an improved curvilinear design that increases structural integrity and allows for attachment from the main gusset 30.

Because the frame does not have the conventional seat tube and the connection of the seat tube to the down tube 16, support members are used to provide support to the frame against the constant vertical forces present against the bicycle frame, as well as minimizing vibration and impact forces traditionally reduced with diamond-frame construction. The support members also dampen horizontal forces, especially lateral flex, often imposed on bicycle frames. Accordingly, support members, such as gussets or braces 30, 60, 70, 90, are provided to support the frame 10 across all force angles. The gussets counteract horizontal forces directed front to back and side to side, as well as vertical forces down and across the top and down tubes 12 and 16. The gussets are preferably attached and shaped to provide support without interfering with operation of the bicycle (shown in FIG. 3). Although preferably four gussets are provided on the frame 10, more or less than four gussets may be used along as support is provided against vertical and horizontal forces common to bicycles.

The main gusset 30 supports the frame 10 against vertical forces due to the rider's weight, braking forces, shocks, as well as horizontal forces left/right and forward/back due to the same inputs plus possible impacts. The gusset 30 is preferably flat and elongated, and may be formed as a single unitary piece. The gusset 30 has a front end 32, a rear end 40, and an intermediary portion 50 therebetween. The front end 32 has a slightly upturned elongated front support arm 34 that is angled upward and away from the down tube 16. The distal front end 36 of the front arm 34 forms an upward facing edge. The edge is relatively straight or slightly curved to match the shape of and be welded to the inner surface of the top tube 12 just behind the head tube 14. The proximal end of the front arm 34 leads downward toward the down tube 16 and forms a front foot 38 with a generally downward facing edge. The edge is relatively straight or slightly curved, to match the shape of and be welded to the front portion of the down tube 16. The primary function of sections 32, 34, 36, and 38 is providing support against horizontal forces from braking and impact. Secondary functions of sections 32, 34, 36, and 38 include support against vertical forces due to the rider's weight, shock, etc.

An intermediary portion 50 of gusset 30 may be relatively straight. It has an intermediary foot 52 that is relatively longer than the front foot 38. The intermediary foot 52 has a generally downward facing straight edge that is welded to the middle portion of the down tube 16. The primary function of portions 50 and 52 is to provide support against vertical forces due to the rider's weight, shocks, etc. Secondary functions of those portions include support against horizontal forces.

A rear end 40 of the gusset 30 also has a slightly upturned arm 44 that extends away from the down tube 16 and toward yoke 22. A distal rear end 46 of the rear arm 44 has a downward facing edge. That edge may be relatively straight or slightly curved to match the shape of and be welded to the inner surface of the chain stays yoke 22 just outside of where it engages the down tube 16.

Accordingly as shown, the top edge of the down tube gusset 30 forms a single unitary continuous edge. It is relatively straight at the intermediary portion 50 and is curved upward slightly at the front and rear ends 32, 40. The top edge is substantially parallel to the down tube 16. The bottom of the down tube gusset 30 matches the down tube 16 curve. The gusset 30 may include a front opening 61 at the front end of the bike, two slots 62 and 64, a curved opening 66 at the intermediate portion, and a rear opening 68 at the rear end of the bike. These openings and slots 61, 62, 64, 66 and 68 minimize the amount of material needed for the gusset 30, while still providing sufficient strength for the gusset 30 to support the bicycle. It should be apparent that more or fewer openings and slots can be utilized. The cutouts 62 and 64 along the down tube also minimize material use, as well as provide welding access.

As seen in FIGS. 2A and 2B, the main gusset 30 extends from just inside the head tube, substantially the entire length of the down tube 16 to the yoke 22 and chain stay 20. Thus, the main gusset 30 connects the down tube 16 to both the top tube 12 and the chain stay yoke, which is preferably at an obtuse angle with respect to the down tube 16. In this way, a downward force on the top tube 12 is translated through to the chain stay 20 and chain stay yoke 22. And, the top tube 12 connects more directly to the down tube 16 by the front foot 38, which also provides support to the top tube 12 in both the horizontal and vertical direction. The gusset's shape, including its attachment points, braces horizontal forces against the head tube and against lateral flex due to pedaling forces. It also dissipates road impact across a larger portion of the frame. It also supports the frame against vertical forces due to rider's weight. Vertical forces across the top tube 12 and chain stays 20 and chain stays yoke 22 are resisted by the gusset's shape and attachments at its distal ends.

The top-front seat tube gusset 70 supports the frame 10 against vertical forces due to the rider's weight. The gusset 70 is preferably flat and elongated, and may be formed as a single unitary piece having a front and rear end. The distal front end of the gusset 70 forms a downward facing edge. That edge is relatively straight or slightly curved, to match the shape of and be welded to the outer surface of the top tube 12. The proximal end of the gusset 70 leads upward toward the upper seat tube portion 26 with a generally backward facing edge. The edge is relatively flat to match the shape of and be welded to the front portion of the upper seat tube portion 26. The primary function of the gusset 70 is to brace vertical forces against the seat tube segment 24, helping to dissipate them across the top tube. Secondary functions of the gusset 70 include dissipating road impact and shock across a larger portion of the frame and supporting against lateral flex due to pedaling forces.

As seen in FIGS. 2A and 2B, the front edge of the top-front seat tube gusset 70 preferably forms a single unitary continuous edge. It may be relatively curved at both ends. The bottom of the top-front seat tube gusset 70 generally mirrors the curvature of a support 80 underneath the seat tube segment 24. The gusset 70 may have an opening, which minimizes the amount of material need to from the gusset 70, while still providing sufficient strength for the gusset 70 to support the bicycle. The opening also provides welding access. The gusset's shape, including its attachment points, braces vertical forces against the seat tube segment 24, helping to dissipate them across the top tube, and dissipates road impact and shock across a larger portion of the frame.

The bottom-front seat tube gusset 90 supports the frame 10 against vertical forces due to the rider's weight. It also supports against lateral flex due to pedaling forces. The gusset 90 may be flat and elongated, and may be formed as a single unitary piece having a front and rear end. The distal front end of the gusset 90 forms an upward facing edge. The edge is relatively straight or slightly curved, to match the shape of and be welded to the inner surface of the top tube 12. The proximal end of the gusset 90 leads downward toward the seat tube segment support 80 with a generally backward facing edge. The edge is curved to match the shape of and be welded to the front portion of the support 80. The primary function of the gusset 90 is to brace vertical forces against the seat tube segment 24, helping to dissipate them across the top tube. Secondary functions of the gusset 90 include dissipating road impact and shock across a larger portion of the frame and supporting against lateral flex due to pedaling forces.

The top edge of the top-front seat tube gusset 90 preferably forms a single unitary continuous edge. It is relatively curved at both ends. The bottom of the top-front seat tube gusset 90 generally mirrors the down tube 16 curve. The gusset 90 forms an opening, which minimizes the amount of material needed to form the gusset 90, while still providing sufficient strength for the gusset 90 to support the bicycle. The opening also provides welding access. The gusset's shape, including its attachment points, braces vertical forces against the seat tube segment 24, helping to dissipate them across the top tube, and dissipates road impact and shock across a larger portion of the frame and supporting against lateral flex due to pedaling forces.

The support 80 of the seat tube segment 24 is preferably flat and curved into a generally circular shape that helps support the frame against vertical forces due to rider's weight. The circular support's 80 semi-circular shape, as well as its attachment points, braces vertical forces against the seat tube segment, helping to dissipate them across the top tube 12. The support 80 supports against lateral flex due to pedaling forces. It also dissipates road impact across a larger portion of the frame. It is welded to the top tube 12 just in front of the seat tube segment 24, to the bottom of the abbreviated lower seat tube portion 28 and to the top tube just in back of the seat tube segment 24. Circular support 80 encloses the entire bottom 28 of the seat tube segment 24. Circular support 80 attaches to the top tube 12 on the two opposite sides of the seat tube segment 24. The shape of the circular support 80 allows for fluid attachment to the bottom-rear seat tube gusset 60 and the bottom-front seat tube gusset 90 and helps support the seat tube segment 24 from moving laterally, as well as acting against forces along the median plane of the frame.

The bottom-rear seat tube gusset 60 supports the frame 10 against vertical forces due to the rider's weight. It also supports against lateral flex due to pedaling forces. The gusset 60 is preferably flat and elongated, and may be formed as a single unitary piece having a front and rear end. The distal front end of the gusset 60 forms a forward facing edge. That edge is curved to match the shape of and be welded to the back portion of the circular support 80. The proximal end of the gusset 60 leads upward toward the top tube 12 with a generally upward facing edge. The edge is relatively straight or slightly curved, to match the shape of and be welded to the bottom surface of the top tube 12. The primary function of the gusset 60 is to brace vertical forces against the seat tube segment 24, helping to dissipate them across the top tube. Secondary functions of the gusset 60 include dissipating road impact and shock across a larger portion of the frame and supporting against lateral flex due to pedaling forces.

The bottom edge of the bottom-rear seat tube gusset 60 may form a single unitary continuous edge. It is relatively curved at both ends. The top of the bottom-rear seat tube gusset 60 generally mirrors the curvature of the seat tube segment circular support 80. The gusset 60 may have an opening, which minimizes the amount of material used to make the gusset 60, while still providing sufficient strength for the gusset 60 to support the bicycle. The opening also provides welding access. The gusset's shape, including its attachment points, braces vertical forces against the seat tube segment 24, helping to dissipate them across the top tube, and dissipates road impact and shock across a larger portion of the frame and supporting against lateral flex due to pedaling forces.

Gussets 30, 60, 70 and 90 and support 80 are preferably each comprised of metal plates, such as aluminum and more preferably 0.09" 6061 aluminum. Other materials for the metal plates may include steel (typically 41xx series "chromoly" steel), titanium (3AL-2.5V&6AL-4V, for instance) and carbon-fiber-reinforced polymer. This is the thinnest possible gusset size to allow for support and still maintain structural and aesthetic integrity while welding. Aluminum type (6061) matches the rest of the frame and fork. Of course other suitable sizes and shapes can be provided. The main gusset 30 can be attached to the head tube 14, instead of or in addition to top and bottom tubes 12 and 16.

Gussets 30, 60, 70, and 90 are located so as not to interfere with operation or safety of the bicycle. Gusset shapes provide support with the minimum material possible while still maintaining structural integrity during welding. The present invention changes the traditional diamond frame shape to reflect the seat tube removal, as well as structural needs. The down tube 16 is curved slightly upwards as described above to resist vertical forces. The chain stays 20 are curved slightly downwards to dissipate vertical forces and work in tandem with the down tube to also resist horizontal forces. This also allows for a new way to accommodate a belt-driven drive train by allowing the un-"breakable" belt to be inserted directly from between the cog and the chain ring, which would otherwise be accomplished by creating a break in the frame to allow passage of the belt onto the cog and chain ring.

The gussets 30, 60, 70 and 90 are preferably welded close to tubes of the frame 10 and designed such that they are aerodynamic and don't interfere with the biker. The long, sleek designs of all gussets 30, 60, 70 and 90 also simultaneously support the frame structure in the absence of a traditional seat tube. They are also crafted out of the thinnest possible material to capitalize on aluminum's uniquely lightweight strength and minimize on material use.

Figure 4A:
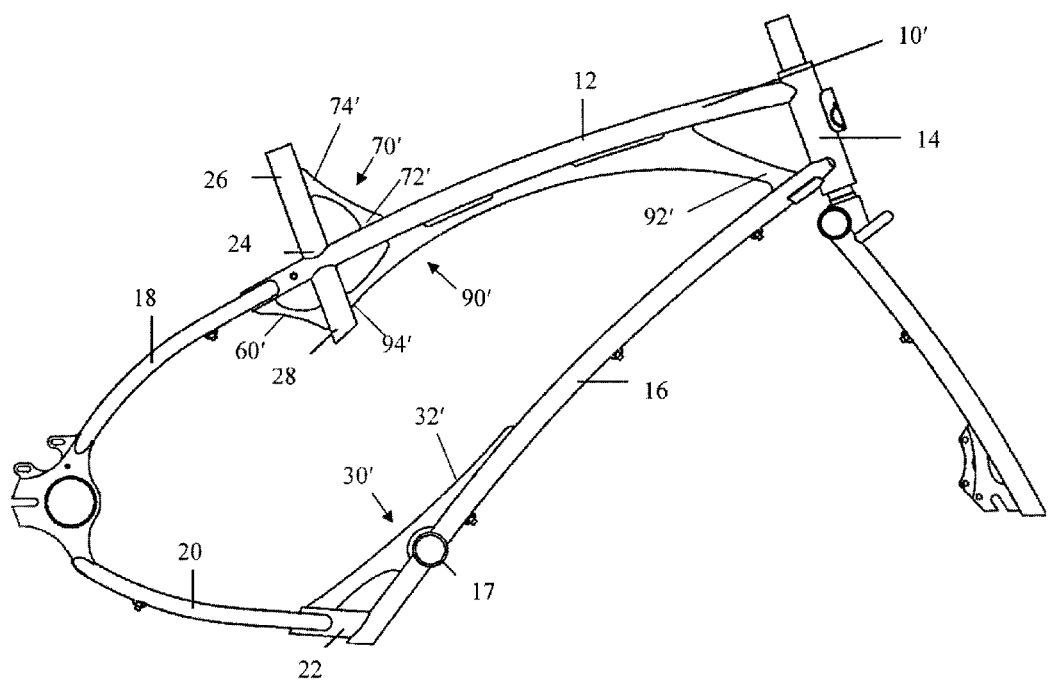
FIGS. 4A and 4B are elevational and perspective views, respectively, of a bicycle frame according to a second exemplary embodiment of the present invention.
Figure 4B:
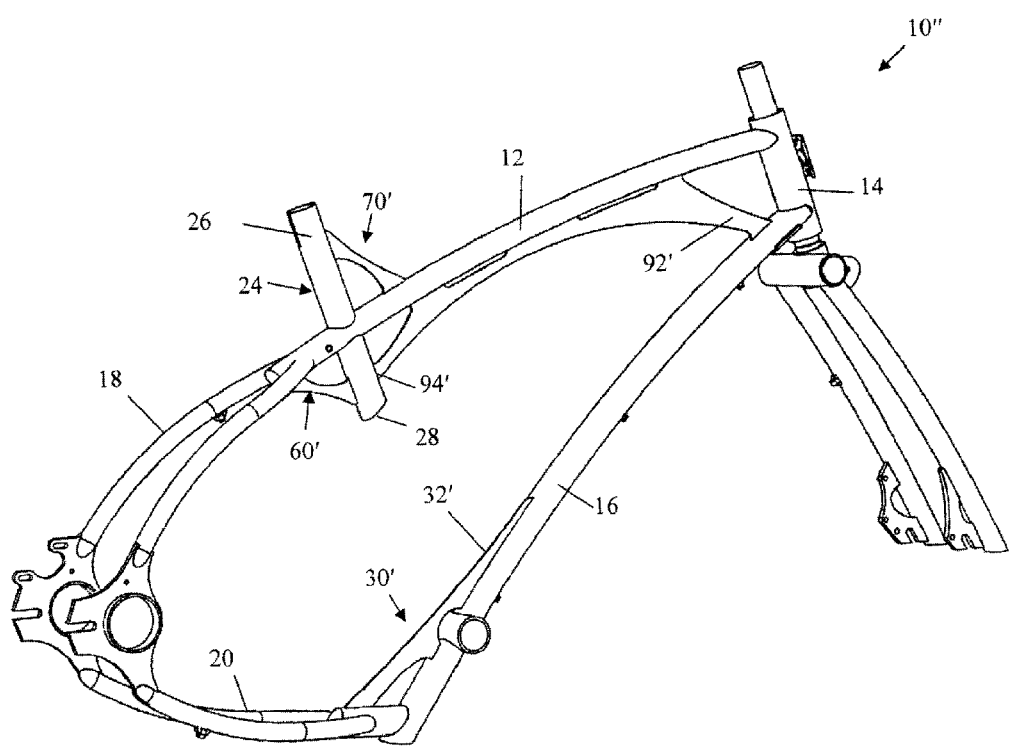

FIGS. 4A and 4B illustrate a second exemplary embodiment of the bicycle frame 10', which is similar to the frame 10 of the first embodiment, except that it accomplishes frame support with a top tube-based approach. That is, the main gusset 90' is attached to the top tube 12 rather than the down tube 16 like in the first embodiment but provides the same support across the head tube 14. Similar to the first embodiment, the frame 10' of the second embodiment employs a plurality of support members, such as gussets 30', 60', 70' and 90'. The gussets 30', 60', 70' and 90' are similar to the gussets of the first embodiment in that they are preferably formed of flat, thin metal plates with openings disposed therein to reduce material.

The main gusset 90' generally extends the length of the top tube 12 and couples to the inner surface of the top tube 12 along its length. One end 92' of the gusset 90' attaches to the inner surface of the down tube 16 and the opposite end 94' attaches to the seat tube segment 24, preferably at its bottom 28 (and can attach to head tube 14 in addition to or instead of bottom tube 16). The down tube gusset 30' extends between a bottom portion of the down tube 16 and the chain stay yoke 12 such that a portion 32' of the length of the gusset 30' is attached to the inner surface of the down tube 16. The bottom-rear seat tube gusset 60' extends between an inner surface of the seat stays 18 and the seat tube segment 24, preferably at its bottom 28. The top-front seat tube gusset 70' has one end 72' attached to an outer surface portion of the top tube 12 and the opposite end 74' attached to the top portion 26 of the seat tube segment 24. In the second embodiment of the frame 10', the circular support 80 of the first embodiment is removed.

Like in the first embodiment, all of the gussets 30', 60', 70', and 90' support the frame 10 against vertical forces due to the rider's weight, braking forces, shocks, as well as horizontal forces left/right and forward/back due to the same inputs plus possible impacts. The gussets 60', 70', and 90' around the seat tube segment 24 and attaching to the upper seat tube portion 26 and lower seat tube portion 26 have the primary function of bracing vertical forces against the seat tube segment 24, helping to dissipate them across the top tube. Secondary functions include dissipating road impact and shock across a larger portion of the frame and supporting against lateral flex due to pedaling forces. The main gusset 90' also primarily supports against horizontal forces due to braking forces, shocks, as well as horizontal forces left/right and forward/back due to the same inputs plus possible impacts. The shorter down tube gusset 30' that connects to the chain stay yoke 22 provides extra support at that critical junction.

Figure 5A:
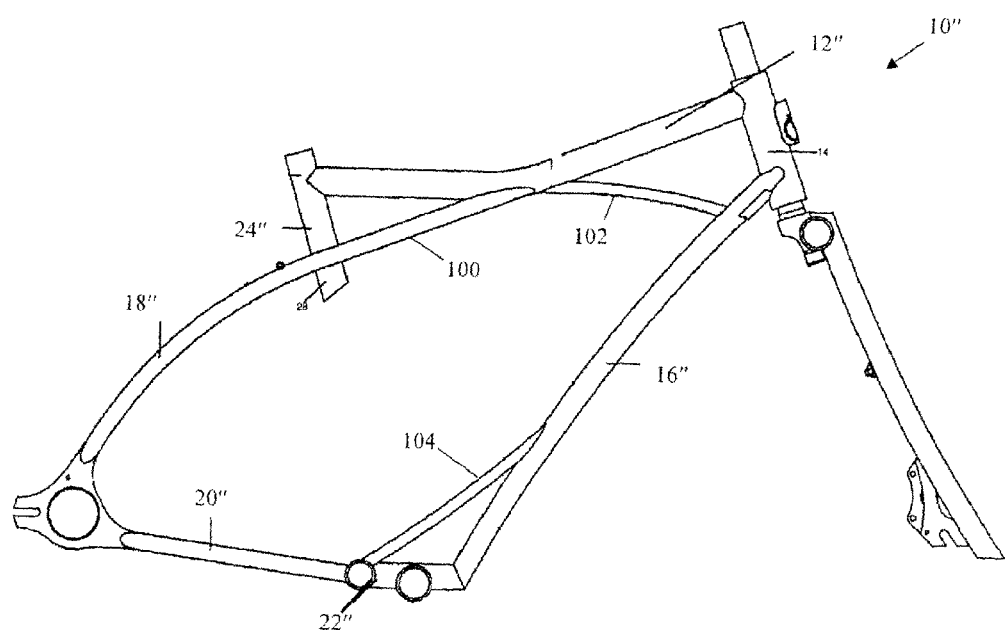
FIGS. 5A and 5B are elevational and perspective views, respectively, of a bicycle frame according to a third exemplary embodiment of the present invention.
Figure 5B:
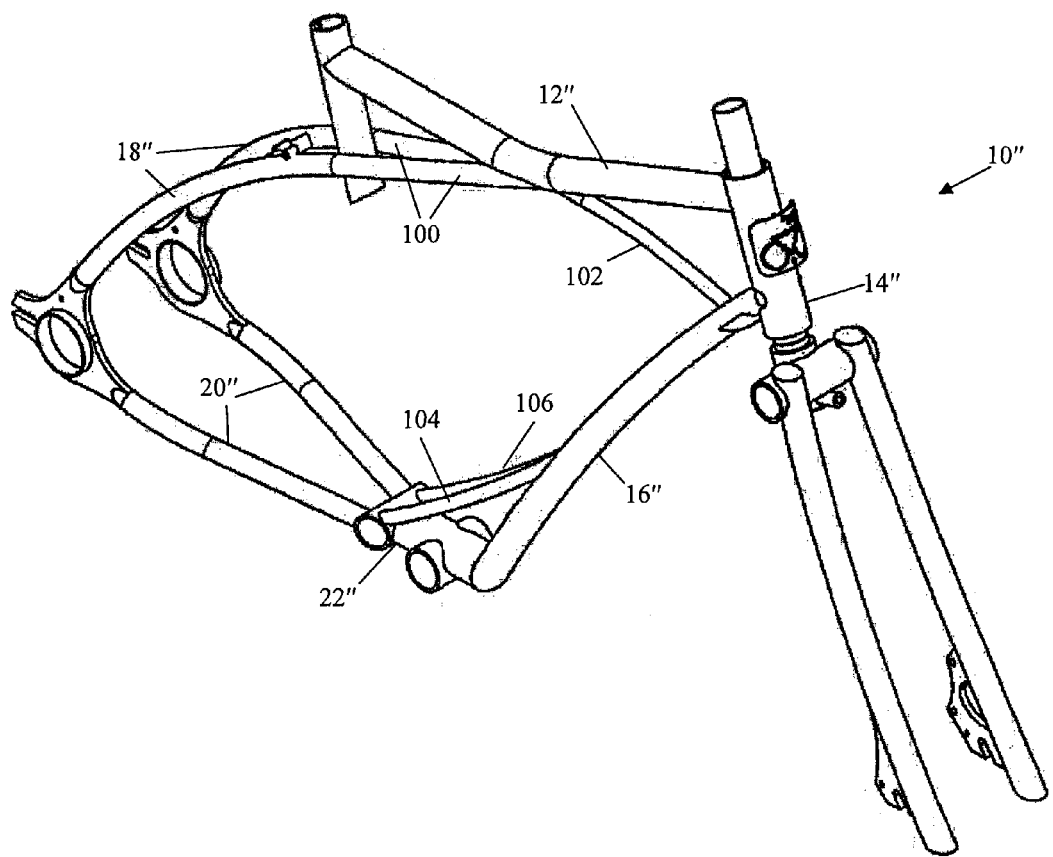

FIGS. 5A and 5B illustrate a frame 10" according to a third exemplary embodiment of the present invention that is similar to the frames of the first and second embodiments, except that frame support is accomplished using support members, such as extended seat stays and gussets formed as rounded elongated braces. The frame 10" of the third embodiment has a top tube 12", a head tube 14", a down tube 16", seat stays 18", chain stays 20" and a chain stays yoke 22" that each has a curvature and shape that are slightly different than those same components of the frames of the first and second embodiments. More specifically, the top tube 16" has a general V-shape having a bend toward its bottom and extends between the head tube 14" and the top portion 26" of the seat tube segment 24". Top tube 12" has a bend at about its middle to also form a general V-shape. Each of the seat stays 18" has an extended portion 100 that connects to an inner surface of the top tube 12". A first or top tube brace 102 extends between and is coupled to the inner surface of the top tube 12" at about a middle portion thereof and an inner surface of the down tube 16 near a top portion thereof, thereby connecting the top and down tubes 12" and 16". Second and third bottom braces 104 and 106 extend between and are coupled to the inner surface of the down tube 16" near a bottom portion thereof and the yoke 22", as best seen in FIG. 5B. As in the first and second embodiments, coupling of the components of the frame 10" are preferably down by welding.

All of the braces 102, 104, and 106 support the frame 10" against vertical forces due to the rider's weight, braking forces, shocks, as well as horizontal forces left/right and forward/back due to the same inputs plus possible impacts. The extended portions 100 of the seat stays 18" which extend from the seat tube segment 24" and attach to the top tube portion 12" have the primary function of bracing vertical forces against the seat tube segment 24", and helping to dissipate them across the top tube 12". Secondary functions include dissipating road impact and shock across a larger portion of the frame and supporting against lateral flex due to pedaling forces. The top tube brace 102, which attaches to the top tube 12" and down tube 16", also primarily supports against horizontal forces due to braking forces, shocks, as well as horizontal forces left/right and forward/back due to the same inputs plus possible impacts. The braces 104 and 106 that connect to the chain stay yoke 22" and down tube 16" provide support at that critical junction.

Gussets and braces in FIGS. 4A, 4B, 5A and 5B are placed so as not to interfere with operation or safety of the bicycle. Gusset shapes provide support with the minimum material possible while still maintaining structural integrity during welding. The traditional diamond frame shape is changed to reflect the seat tube removal, as well as structural needs. The down tube is curved slightly upwards as described above to resist vertical forces. The chain stays 20″ in FIGS. 5A and 5B are curved slightly downwards to dissipate vertical forces and work in tandem with the down tube to also resist horizontal forces. This also allows for a new way to accommodate a belt-driven drive train, which would otherwise be accomplished by creating a break in the frame to allow passage of the belt onto the cog and chain ring.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law. For example, the first, second, and third embodiments of the frame can be combined. That is, the gussets or braces from one embodiment may be added to another embodiment. For example, the gusset 90′ of FIGS. 4A and 4B may be added to the frame 10 of FIGS. 2A and 2B, or the gusset 30 of FIGS. 2A and 2B may be added to the frame 10′ of FIGS. 4A and 4B. Alternatively, the braces and extended portions of FIGS. 5A and 5B may be added to the frame 10 of FIGS. 2A and 2B or frame 10′ of FIGS. 4A and 4B.

What is claimed is:

1. A bicycle frame, comprising:
    a head tube adapted to support a handle bar;
    a top tube coupled to said head tube;
    a bottom tube coupled to said head tube;
    a seat tube segment adapted to support a seat, said seat tube segment has a top portion that extends above said top tube and a bottom portion with a bottom end, wherein the bottom end of said seat tube segment extends below said top tube and is a free end that is spaced apart from said bottom tube; and
    a flat elongated gusset extending substantially along an entire length of said bottom tube and having an end connected to the inner surface of said top tube, at least one foot connected to the inner surface of said bottom tube, and being disconnected from said head tube to form a space between the top tube, bottom tube and head tube, said gusset being substantially smaller than a space between said bottom tube and said top tube.

2. A bicycle frame according to claim 1, wherein said thin elongated gusset is coupled to a chain stay.

3. A bicycle frame according to claim 1, said gusset having a plurality of feet connected to the inner surface of said bottom tube, and at least one slot extended between neighboring ones of said plurality of feet to form a space between said gusset and the inner surface of said bottom tube.

4. A bicycle frame, comprising:
    a head tube adapted to support a handle bar;
    a top tube coupled to said head tube;
    a bottom tube coupled to said head tube;
    an elongated support member comprising a flat plate having a length and a height, wherein the length is substantially greater than the height, said at least one elongated support member extending along an entire length of said top tube and having an end connected to the inner surface of said bottom tube and at least one foot connected to an inner surface of said top tube, and being disconnected from said head tube to form a space between the top tube, bottom tube and head tube, said gusset being substantially smaller than a space between said bottom tube and said top tube; and
    a seat tube segment adapted to support a seat, said seat tube segment having a top portion extending above said top tube and a bottom portion extending below said top tube, the bottom portion having a bottom end that is spaced apart from said bottom tube.

5. A bicycle frame according to claim 4, wherein said elongated support member is a substantially flat gusset.

6. A bicycle frame according to claim 4, further comprising
    first and second seat stays coupled to said top tube;
    first and second chain stays coupled to said bottom tube; and
    said elongated support member extending between said first and second chain stays and said bottom tube.

7. A bicycle frame according to claim 4, said gusset having a plurality of feet connected to the inner surface of said top tube, and at least one slot extended between neighboring ones of said plurality of feet to form a space between said gusset and the inner surface of said top tube.

8. A bicycle frame, comprising:
    a head tube adapted to support a handle bar;
    a top tube coupled to said head tube;
    a bottom tube coupled to said head tube;
    a seat tube segment adapted to support a seat, said seat tube segment having a first portion extending above said top tube and a second portion extending to just below said top tube and spaced apart from said bottom tube, said second portion having a distal end; and
    a circular or arc-shaped support coupled to the distal end of the second portion of said seat tube segment, said support having a first end coupled to a bottom of the top tube on a first side of said seat tube segment, and a second end coupled to the bottom of the top tube on a second side of said seat tube segment to encircle the distal end of the second portion of said seat tube segment.

9. A bicycle frame according to claim 8, further comprising a plurality of secondary gussets extending between the first and second portions of said seat tube segment and said top tube.

10. A bicycle frame according to claim 8, wherein said circular or arc-shaped support is formed of aluminum.

11. A bicycle frame according to claim 8, further comprising a gusset having a first end connected to the circular or arc-shaped support and a second end connected to the bottom of the top tube to further support the seat tube segment.

* * * * *